United States Patent [19]

Rule et al.

[11] 4,075,360

[45] Feb. 21, 1978

[54] PREPARATION OF IMITATION MOZZARELLA CHEESE

[75] Inventors: Charles E. Rule, Lakewood; Charles E. Werstak, Medina, both of Ohio

[73] Assignee: SCM Corporation, New York, N.Y.

[21] Appl. No.: 752,260

[22] Filed: Dec. 20, 1976

Related U.S. Application Data

[63] Continuation-in-part of Ser. No. 489,583, July 18, 1974, abandoned.

[51] Int. Cl.² .................... A23C 19/02; A23C 19/12
[52] U.S. Cl. .................................... 426/582; 426/585
[58] Field of Search ............... 426/582, 36, 580, 583, 426/585, 657

[56] References Cited

U.S. PATENT DOCUMENTS

| | | | |
|---|---|---|---|
| 3,218,173 | 11/1965 | Loewenstein | 426/657 X |
| 3,922,374 | 11/1975 | Bell et al. | 426/582 |

OTHER PUBLICATIONS

Kosikowski; F., Cheese and Fermented Milk Foods, Published by the Author, Cornell University, Ithaca, N.Y., 1966 (p. 155).

*Primary Examiner*—David M. Naff
*Attorney, Agent, or Firm*—Richard H. Thomas

[57] ABSTRACT

An imitation mozzarella type cheese for pizza pies and other products, where mozzarella cheese is used, is prepared by forming a mixture of specified amounts of a hydrogenated vegetable oil, a caseinate including at least 70% sodium caseinate, a calcium containing salt such as calcium chloride, an edible acid such as lactic acid, flavoring and color. A premix of the components, except the acid, is first prepared and thoroughly mixed at about 130° to about 172° F, and then the premix is directly acidified by the addition of the acid until a pH of about 6 to about 5 is reached. The product on cooling is readily formed into a desired shape, is capable of being grated, and has the properties characteristic of a mozzarella cheese.

9 Claims, No Drawings

PREPARATION OF IMITATION MOZZARELLA CHEESE

This application is a continuation-in-part of prior application Ser. No. 489,583, filed July 18, 1974 and assigned to assignee of the present application, now abandoned.

The present invention relates to a process and novel composition by which an improved imitation mozzarella type cheese product is prepared.

For purposes of the present invention, an imitation cheese product is defined as one in which both the protein and lipid systems are derived from non-dairy sources. This is to be distinguished from a filled cheese product in which the lipid system is replaced by a fat derived from a non-dairy source and the protein is from a dairy source.

BACKGROUND OF THE INVENTION

Filled and imitation cheese products using a vegetable fat in place of butterfat are well-known. Several major factors have influenced their greater acceptance. For one, a vegetable fat is less expensive than its butterfat counterpart. Another factor has been technical improvements in the filled and imitation products and components employed in their manufacture. For instance, functional lipid systems capable of meeting almost any specification are now available.

A truly imitation cheese offers several further advantages over a filled product. Its manufacture avoids the need for maintaining acid-producing micro-organisms conventionally employed in the cheese-making process. Also avoided are the formation of whey as a by-product and the accompanying need for separation and disposal of the same. In addition, the process for the production of an imitation cheese can be semi-continuous whereas processes for production of natural and filled cheeses of necessity are carried out on a batch basis.

From a nutritional point of view, the filled and imitation products are at least of the same quality as their corresponding natural products.

Whereas a large number of filled cheese products exist on the market today, those truly imitation cheese products which have been developed have been more in the nature of soft cheeses, imitation sour creams or sour cream whips, cream cheeses and cottage cheeses. One such product is described in the Elenbogen U.S. Pat. No. 3,397,995 and is characterized as a cream cheese spread. In this patent, lactic acid is incorporated directly into a composition comprising about 15 to 40 percent by weight fat having a ratio of polyunsaturated to saturated fats in the range of about 3:1 to about 9:1, the composition also having about 5 to 13% of a phosphoprotein solid, such as an alkali caseinate, and an amount of a stabilizing vegetable gum the remainder being water.

With regard to mozzarella cheese and other harder cheeses, those new products which have been developed can be more readily categorized as filled cheeses. Prior U.S. Pat. No. 3,579,354 to Kasik et al describes an elastic cheese product which is useful as a substitute for mozzarella cheese prepared from an aqueous dispersion comprising 1 to 15% sodium caseinate and up to 30% butterfat. The fat/sodium caseinate mixture is innoculated with a starter and then is further innoculated with micrococci and allowed to ferment aerobically until the system becomes elastic and plastic in consistency. Acidification then takes place to coagulate the product, the acidification being to a pH of about 5.2 to about 3.2.

The product of the patent is not a true imitation product, and is unduly expensive because of the large amount of butterfat employed. The product also suffers from the disadvantages normally associated with processing of a natural product.

A product on the market is indicated to be an imitation mozzarella cheese. It is stated to have a hydrogenated vegetable oil, an amount of calcium caseinate, salts, adipic acid and other ingredients. The method of manufacture of the product is not known. It has many of the desirable characteristics of mozzarella cheese, for instance good browning characteristics, but does not have the traditional stretch property which so uniquely characterizes mozzarella cheese.

In this regard, mozzarella cheese is a different cheese. It can be characterized as a fresh, high moisture cheese having a relatively bland flavor. The cheese is rubbery in nature, that is, provided with a high degree of stretch, is hard so that it can be grated into flakes, and browns when cooked. It is frequently combined with other foods, for instance, tomato sauce in the preparation of pizza, and in this regard should have good melt-down characteristics providing a continuous fused layer when baked. Further, the cheese should be firm, versus soft, and smooth in texture.

For purposes of the present application, all percentages are weight percentages, based on the weight of the entire formulation, and temperatures are in degrees Fahrenheit, unless otherwise indicated.

SUMMARY OF THE INVENTION

In accordance with the concepts of the present invention, an improved mozzarella-type cheese is obtained by employing as the basic ingredients about 15–35% of a caseinate of which at least 70% is sodium caseinate, about 15–30% of a low melting point hydrogenated vegetable oil, a small amount of a calcium ion providing edible substance such as calcium chloride, and about 0.2–3% of an edible acid, preferably lactic acid, the remainder being water (about 50%) and small amounts of flavor preservative and other ingredients. A first mix is prepared comprising a portion (about 20–50%) of the protein and water, and a second mix is prepared containing the remainder of the protein in the vegetable oil. Both mixes are at relatively high temperatures in the range of about 130°–172° F, for instance about 130° for the water mix and about 130°–170° for the oil mix. Oil soluble ingredients are included in the protein/oil mix and water soluble ingredients such as the calcium chloride, salt and preservative (e.g., potassium sorbate) are included in the protein/water mix. Both mixes are stirred and then are added together and stirred again, still at a high temperature, for instance, at about 135°–172° F. The amount of acid desired is added to the combined mixes to form a mixture which is then thoroughly stirred, and/or homogenized, and pumped to a swept wall heat exchanger or functionally similar piece of equipment where it is cooled, formed, and packaged.

A critical feature of the invention lies in the use of at least about 70% sodium caseinate, as the caseinate component. It is possible to use up to about 30% calcium caseinate with the sodium caseinate, based on the total weight of caseinate present, or about 30% of another suitable edible protein, for example, a vegetable protein such as soy protein, peanut protein, and cottonseed protein. Alternatively, the protein component of the mix can be 100% sodium caseinate. The particular type or brand of sodium caseinate is not critical, and many sodium caseinates and blends thereof are available on the market which can be employed.

The use of at least about 70% sodium caseinate is required to obtain a stretch quality in the finished product approximating that of natural mozzarella cheese. Evidence obtained with varying proportions of sodium and calcium caseinates indicates that approximately equivalent results are obtained with up to 100% sodium caseinate as the caseinate component, so that the present invention lies broadly in the use of about 70–100% sodium caseinate. However, preferably some calcium caseinate or other edible protein, such as a vegetable protein, should be present, about 10–30%. With a blend of about 80% sodium caseinate and about 20% calcium caseinate, an optimum balance between stretch and browning of the final product can be achieved. Preferably the caseinate (protein) portion should be about 15–35% by weight of the total weight of the cheese composition, a preferred range being about 22–25%.

The particular vegetable oil employed is not critical. Preferably, it has a melting point close to or higher than body temperature, and should have good stability and a bland flavor. A number of hydrogenated cottonseed and soybean oils have been found to be satisfactory.

A preferred fat is a cottonseed oil having a Wiley Melting Point of about 104.6° F, an Iodine Value of about 63.0 (calculated), and SFI (Solids Fat Index) as follows:

| 50° F | 46.9 |
| 70° F | 33.8 |
| 80° F | 28.2 |
| 92° F | 14.2 |
| 100° F | 4.8 |
| 110° F | 0.0 |

Advantages in the use of this fat are its availability and relatively low cost. The fat is also quite stable, is bland in flavor, works well during processing of the cheese and provides good melting and grating characteristics in the final product.

Another suitable fat is known as "Durkex" 500 (registered trademark, SCM Corporation). This fat also is a hydrogenated cottonseed oil, has a relatively low Wiley Melting Point, of only about 63° F, and has a free fatty acid content of about 0.05% (maximum), an Iodine Value of about 74–81, and an SFI (Solid Fat Index) as follows:

| 50° F | 14–20 |
| 70° F | 3 max. |

Still a third suitable fat is a hydrogenated vegetable oil such as one used for margarine oil. Cottonseed oil, soybean oil and blends of either with palm oil are useful base stocks for such hydrogenation. The fat has a free fatty acid content of about 0.05, a Wiley Melting Point of about 112°–116° F, and SFI as follows:

| 50° F | 25–30 |
| 70° F | 18–23 |
| 92° F | 11–16 |
| 104° F | 8–12 |

Other fats, or oils, which are bland in flavor, have a Wiley Melting Point of between about 60° to about 120° F, and are derived from cottonseed or soybean oil, may be employed. The amount of fat employed preferably is between about 15% and about 30%, based on the total weight of the product. A preferred range is about 22–26%.

The particular acid employed is not critical. Very satisfactory results were obtained with 1–3% lactic acid, but it would be suitable to use hydrochloric acid, acetic acid, or Genlac C, the latter being a blend of water, citric acid, lactic acid, acetic acid and artificial flavors. Adipic acid may also be employed.

The amount of acid employed is critical. Generally, the acid should be added, in the broad range of about 0.2–3%, until a pH of about 6 to about 5 is reached, a preferred pH range being about 5.8–5.2. It was found that the amount of acid added tended to control the rate of melting of the cheese during baking (in the preparation of a pizza) and also tended to determine if the product remained white or burned. Too high an acid content prevented browning, adversely affected the melt-down characteristics of the cheese, and adversely affected stretch qualities; too low an acid content tended to cause burning and the formation of a crust-like product which was soupy underneath.

In this regard, a pizza is manufactured by grating the cheese onto the surface of the pie after the tomato sauce has been placed on the pie. The pie is inserted in an oven, and at the temperature of the oven, the cheese is melted and fused to produce a uniform homogeneous surface. The product is considered defective if there is insufficient melt-down at the temperature of the oven and time of cooling to leave distinctive flake shapes on the surfaces of the pie. Certain pizza manufacturers may or may not prefer to have bubbling of the tomato sauce through the cheese layer to the surface.

Burning is believed to take place with the flow of protein to the surface. Soupiness results when the remaining vegetable oil tends to mix with the tomato sauce. It is surmised that the acid acts as a binder between the protein and vegetable oil preventing these adverse effects.

The addition of a calcium ion containing salt or other ionizable, edible calcium providing substance to the mozzarella cheese composition is critical. The calcium ion is important in reacting with the protein, free calcium ions improving stretch, browning, and melt-down characteristics. Other ionizable calcium containing substances besides calcium chloride may be employed, such as calcium hydroxide or calcium carbonate, although calcium chloride is a compound traditionally used as an additive in the cheese industry and is preferred in the process of the present invention. Preferably about 0.8% calcium chloride is added to the cheese composition although this may be varied somewhat, the broad range for this component being 0.5–1%. By ionizable, it is meant substantially water soluble.

In addition to the above ingredients, flavoring ingredients, color ingredients such as beta-carotene or "Egg Shade" (trademark, SCM Corporation), table salt for flavor, potassium sorbate (a preservative) and a vitamin supplement may be employed. The balance of the formulation (about 45–53%) is water.

For purposes of the present application, such ingredients as the vegetable oil, protein, acid, calcium salt and water can be considered active ingredients contributing to the functionality of the final product, in terms of such properties as stretch, browning and melt-down. An important active ingredient which may be added to the cheese formulation of the present invention is an organic emulsifying agent, for instance a polyglycerol ester such as decaglycerol decaoleate. This emulsifying agent may be used in the proportion of about 0–3% based on the weight of the entire formulation. Another suitable emulsifying agent is polyoxyethylene (20) mono and diglycerides of fatty acids. The emulsifying agent functions to enhance melt-down characteristics, and also retards oiling-off or separation of fat and casein. Another advantage is that is provides a dramatic decrease in viscosity during processing permitting substantial versatility with regard to processing steps and equipment. Other substances such as the flavor and color components, the preservative and vitamin supplement can be considered to be functionally inert substances. Thus, when it is stated that the formulation of the present invention consists essentially of oil, water, protein, acid and calcium providing substance, this is deemed to refer to only the "active" ingredients and does not preclude the addition of small amount of the functionally inert substances.

EXAMPLE 1

The following example illustrates the preparation of a mozzarella cheese suitable for pizza pies, or any other product wherein mozzarella cheese is used.

The following formulation is employed:

| | | |
|---|---|---|
| Hydrogenated Cottonseed Oil WMP 104.6° F | | 22.63% |
| Sodium Caseinate | | 19.40% |
| Calcium Caseinate | | 4.85% |
| Lactic Acid | | 0.32% |
| Calcium Chloride | | 0.87% |
| Potassium Sorbate | | 0.133% |
| Salt (NaCl) | | 0.742% |
| Flavor | | 0.297% |
| Water | | 50.758% |
| | Total | 100.00 % |

A first water mix is prepared containing the salt, calcium chloride, and potassium sorbate in water at about 70° F. About 20–30% of the sodium caseinate and all the calcium caseinate are added to this water mix and the mix is stirred and gradually heated to about 130° F. This produces a pourable, homogeneous, thick paste having the appearance and consistency of oatmeal.

The vegetable fat (104.6° F cottonseed oil) is heated to about 130°–160° F and the remaining sodium caseinate is added to it and stirred. This produces a mix which is slightly less viscous than the oil mix and is more of the consistency and appearance of a thin milk shake.

The oil/caseinate mix is then added to the water mix and the combined mixture is agitated and heated to 165°–172° producing a slightly lumpy product. When the mixture is free of lumps the lactic acid and flavor are then added to the mixture with agitation, still at about 170° F. Acid addition is carried out until a pH of about 5.8 is reached. During acid addition, the additional lumpiness disappears resulting in a fine grain or fine particle suspension. Further agitation, still at 170° F, however, yields a smooth, homogeneous product. This mixture is then pumped to an homogenizer operated at about 1,000 psi (first stage), and from there to a swept wall heat exchanger where it is cooled to about 72° F, extruded into 5-pound prints, packaged, and stored at 40° F.

As an alternative, it may be desirable to pump directly to the heat exchanger subsequent to the addition of lactic acid avoiding homogenization.

Many homogenizers are commercially available on the market, one suitable homogenizer being a two-stage homogenizer manufactured by Manton-Gaulin, Lab 100/100. A suitable swept surface heat exchanger is one manufactured by Votator, Model No. 68-209V, identified as a "C" unit. The heat exchanger is in the form of a cooled wall cylinder with internal blades which scrape the wall. The viscous mix at about 170° F is deposited on the wall of the cylinder where it cools to about 72° F and is solidified. The blades not only scrape the wall but also force the solidified cheese product through a former/printer. In the present case, a square extruder was employed at an exit temperature of about 72° F to produce square prints of five pounds each.

Time is critical in the final mixing step, and the mixture should not be held at 170° after acid addition for more than an hour. If held at a high temperature too long, an interaction occurs increasing the viscosity of the material.

The final product resembles mozzarella cheese in appearance and can be grated and sliced similar to such cheese. It was baked on a pizza pie at 425° and after 16 minutes had a color similar to mozzarella cheese, melt properties similar to the cheese, and a stretch equal to 30–50% of natural mozzarella cheese. It also equalled the natural cheese in texture.

EXAMPLE 2

An alternative formulation may employ about 80% sodium caseinate, 20% calcium caseinate and a fat such as "Durkex" 500.

| | | |
|---|---|---|
| "Durkex" 500 | | 24.20% |
| Decaglycerol Decaoleate | | 1.40% |
| Sodium Caseinate | | 19.23% |
| Calcium Caseinate | | 4.80% |
| Calcium Chloride | | 0.80% |
| Acid (Genlac C) | | 2.40% |
| Water | | 47.17% |
| | Total | 100.00% |

In addition to the above components, the formulation may include minor amounts of flavor, coloring and other ingredients.

A first homogeneous blend of sodium and calcium caseinates was added, 50% to the lipid system of "Durkex" 500 and decaglycerol decaoleate, and 50% to water, both at 140° F. These mixes were each agitated until homogeneous and then were combined, still at 140° F, to form a homogeneous combined mixture. The acid was then added to the mixture, with rapid agitation, until a pH of about 5.3 was obtained. The mixture was then pumped to a votator where it was cooled, extruded into five-pound prints, packaged, and stored at 40° F.

Carboxymethylcellulose may be included in the formulation to bind up or hold water during baking. Other emulsifiers than decaglycerol decaoleate may be used.

If desired, the product of this invention can be used as an extender, for instance to provide a mozarella cheese product having 50% natural mozzarella cheese and 50% imitation cheese.

An important ingredient contributing to properties of the mozzarella cheese product in this example was the emulsifying agent, decaglycerol decaoleate. As indicated above, it contributed to melt-down and non-oiling characteristics. It also dramatically decreased viscosity of the mix during processing.

EXAMPLE 3

This example illustrates preparation of a mozzarella cheese using only sodium caseinate. The following formulation is employed:

| | | |
|---|---|---|
| "Durkex" 500 | | 22.52% |
| Sodium Caseinate | | 24.13% |
| Lactic Acid | | 1.93% |
| Calcium Chloride | | 0.58% |
| Sorbic Acid | | 0.02% |
| Beta-Carotene | | 0.002% |
| Flavor | | 0.643% |
| Water | | 50.175% |
| | Total | 100.00 % |

A water mix is prepared, at about 80° F, by the addition of calcium chloride, sorbic acid, beta-carotene, and flavor, followed by agitation. Fifty percent (50%) of the sodium caseinate is added to the water mix and the same gradually is heated to 150° F until homogeneous. The fat mix is prepared by heating the fat to 125° F and adding the remaining sodium caseinate to it. This mix is then gradually heated to 150° F and agitated until homogeneous.

The oil/caseinate mix is added to the water mix and the same is agitated until the mass is homogeneous. Gradually lactic acid is added to the combined mix, during agitation and still at 150° F. The final mixture is then passed to the swept wall heat exchanger where it is cooled and formed into five-pound prints, packaged and stored at 40° F.

This product has good stretch properties, but slightly poorer browning qualities than the preparations of Examples 1 and 2.

The lactic acid was used in diluted form, in the proportion of 60% lactic acid and 40% water.

EXAMPLE 4

This example illustrates the criticality of the acid content in the formulation of the present invention. Comparative tests were carried out with the following cheese formulation, the only variable being the amount of acid added.

| Ingredient | Grams |
|---|---|
| "Durkex" 500 | 156 |
| Decaglycerol decaoleate | 9 |
| Water | 294 |
| Sodium Caseinate | 120 |
| Calcium Caseinate | 30 |
| Lactic Acid | Varied |

The cheese formulations were prepared as in Example 1, and then were shredded onto a series of pizzas, at 20 grams per one-quarter pizza, and baked for 16 minutes each at 425° F. The following table gives pH and acid concentration for the various samples.

Table 1

| Sample | pH | Acid Added mls. |
|---|---|---|
| 1 | | 15.5 |
| 2 | | 14.5 |
| 3 | | 13.5 |
| 4 | | 12.5 |
| 5 | | 11.5 |
| 6 | 5.1 | 10.5 |
| 7 | 5.2 | 9.5 |
| 8 | 5.2 | 8.5 |

Table 1-continued

| Sample | pH | Acid Added mls. |
|---|---|---|
| 9 | 5.4 | 7.5 |
| 10 | 5.5 | 6.5 |
| 11 | 5.6 | 5.5 |
| 12 | 5.6 | 4.5 |

At the same time, a control sample was prepared, a pizza with natural mozzarella cheese.

The pH in the above samples below 5.1 was believed to range down to 4.8 for Sample 1, but accurate pH measurements were not taken. In Samples 7 and 8, even though the amounts of acid added were different, the pH readings were essentially the same, about 5.2. The same was true with Samples 11 and 12.

Following baking, the different samples were evaluated, at 8 minutes baking time, and 16 minutes baking time. Samples 1–5 turned curdy and gave a cheese product with no stretch. Samples 6, 7 and 8 after 8 minutes baking showed complete melting. Sample No. 8 bubbled similar to the control, but appeared to be forming a crust. Samples 6 and 7 melted but not as a continuous bubble similar to natural mozzarella cheese. After 16 minutes Sample No. 8 was the best, showing no curd, only slight running, and some stringiness. Sample No. 7 was the next best showing some stringiness also. However, the sample at 16 minutes was slightly curdy.

Samples Nos. 9, 10 and 11 all puffed and melted forming some scabs. At 16 minutes, the samples were slightly soupy underneath, with some crust and some burning. Sample No. 9 was the best of this series.

It is evident from the above data that, with the formulation used, optimum properties were achieved at pH's of about 5.2–5.4. However, there was no attempt to optimize the formulation, the sole purpose of the tests being to determine the effect of acid addition. Example 2 above employed a pH of 5.3; Example 1, a pH of 5.8. Based on this and other data, a suitable pH range in accordance with the concepts of the present invention is determined to be about 5–6, the preferred range being about 5.2–5.8.

In Examples 1 and 3, the procedure used involved the step of adding the oil/caseinate mix to the water mix, in combining these two mixes. Obviously, this is not critical, and the water mix could as easily have been added to the oil/caseinate mix.

In all of the examples, the cheese compositions were cooled in a swept wall heat exchanger such as a Votator "C" unit. Obviously, cooling can be carried out in a number of other types of equipment, for instance, a simple cooled mixer such as an ice cream maker, or simply a plain jacketed, cooled vat with mixing blades. Alternatively, the cheese compositions could be cooled in an enclosed continuous blade mixer such as disclosed in copending application Ser. No. 721,972, filed Sept. 10, 1976, assigned to assignee of the present application. The subject matter of said copending application is incorporated by reference herein. Specifically, there is illustrated in the copending application a continuous mixer such as described in prior U.S. Pat. Nos. 3,618,902 and 3,419,250, assigned to Teledyne Readco. The equipment marketed by Teledyne Readco is identified as a "Continuous Processor". Another suitable piece of equipment is a mixing apparatus marketed by the Fitzpatrick Company, referred to as the Model "M" "Malaxator", Code 600.

In the above examples, pH readings were taken with a Sargent pH Meter, Model No. PBL, Sargent-Welch Scientific Company.

What is claimed is:

1. The method of producing an imitation mozarella cheese characterized as being sufficiently hard to be gratable and having the stretch, flavor, melt-down, and browning characteristics of natural mozzarella cheese, comprising the steps of:

a. preparing a cheese formulation which consists essentially of about 15–35% edible protein which includes about 70–100% sodium caseinate and up to about 30% calcium caseinate, about 0.5–1.0% of a calcium ion providing substance other than a calcium protein salt, about 45–53% water, up to about 3% organic emulsifying agent, about 0.2–3% of an edible acid, and about 15–30% of a vegetable oil, said vegetable oil having a Wiley Melting Point of about 60°–120° F, said edible acid being present in an amount sufficient to establish a pH of about 6–5; wherein said formulation is prepared by the steps of 1. preparing a first water mix consisting essentially of the water, a portion of the caseinate protein and other water soluble or dispersible ingredients;

2. preparing a second oil mix consisting essentially of the oil, the remaining portion of the caseinate protein and other oil soluble or dispersible ingredients;

3. separately heating said mixes to a temperature of about 130°–172° F, and thoroughly stirring the same; and 4. combining said mixes and adding said edible acid to the combined mixes to provide said pH;

b. thoroughly stirring the resulting mixture at a temperature of about 135°–170° F; and c. cooling the resulting mixture until a hardened product is obtained.

2. The method of claim 1 wherein said first mix and second mix contain, respectively, small amounts of water soluble and oil soluble ingredients selected from the group consisting of coloring, flavoring, preservative, and vitamin supplement.

3. The method of claim 1 wherein said calcium caseinate is present in an amount of about 10 to 30%.

4. The method of claim 3 wherein said oil is soybean oil or cottonseed oil.

5. The method of claim 3 wherein the caseinate protein is about 22–25% of the total cheese formulation.

6. The method of claim 3 wherein the pH range following addition of edible acid is about 5.2–5.8.

7. The method of claim 3 wherein said cooling is carried out in a swept wall heat exchanger.

8. The method of claim 3 wherein said calcium ion providing substance is calcium chloride.

9. The method of claim 3 wherein there is present 80% sodium caseinate and 20% calcium caseinate.

* * * * *

UNITED STATES PATENT AND TRADEMARK OFFICE
CERTIFICATE OF CORRECTION

PATENT NO. : 4,075,360
DATED : February 21, 1978
INVENTOR(S) : Charles E. Rule; Charles E. Werstak It is certified that error appears in the above-identified patent and that said Letters Patent are hereby corrected as shown below:

Col. 2, line 65, change "caseinate" to --caseinates--.
Col. 4, line 32, change "cooling" to --cooking--. Col. 5, line 10, change "is", second occurrence, to --it--; line 20, change "amount" to --amounts--. Col. 9, claim 1, first line, change "mozarella" to --mozzarella--.

Signed and Sealed this

Sixth Day of June 1978

[SEAL]

Attest:

RUTH C. MASON
Attesting Officer

DONALD W. BANNER
Commissioner of Patents and Trademarks